UNITED STATES PATENT OFFICE.

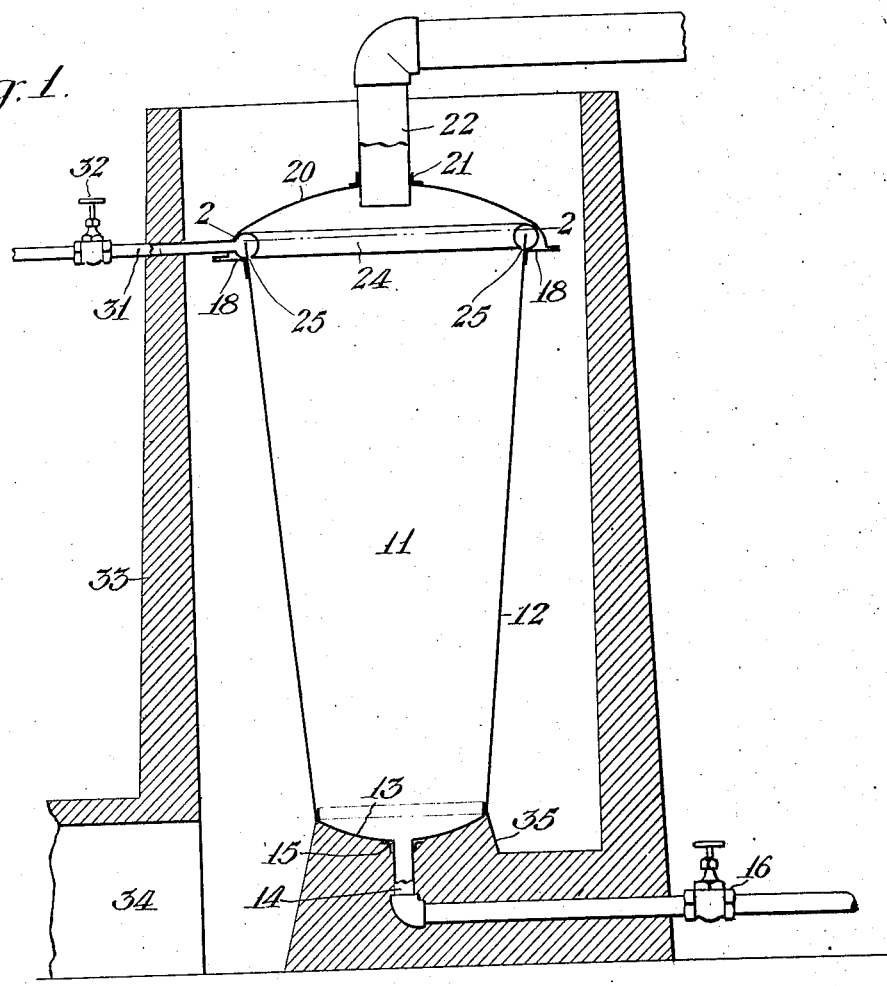
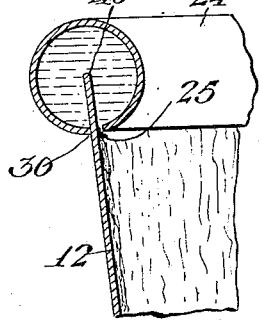
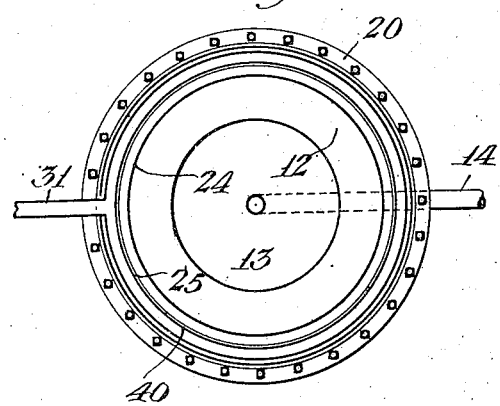
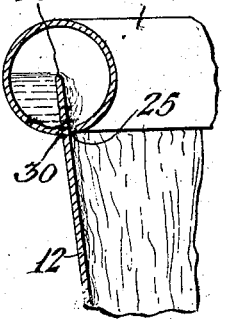

WILLIAM MEISCHKE-SMITH, OF SAN FRANCISCO, CALIFORNIA, ASSIGNOR TO SHELL COMPANY OF CALIFORNIA, A CORPORATION OF CALIFORNIA.

EVAPORATOR.

1,327,247.  Specification of Letters Patent.  Patented Jan. 6, 1920.

Application filed March 26, 1918. Serial No. 224,913.

*To all whom it may concern:*

Be it known that I, WILLIAM MEISCHKE-SMITH, a subject of the King of Great Britain, residing in the city and county of San Francisco and State of California, have invented a new and useful Evaporator, of which the following is a specification.

My invention relates to an apparatus for the purpose of evaporating hydrocarbon oils and other liquids, being more particularly an improvement on the form of vertical still shown in Letters Patent of the United States, No. 996,736, issued to M. J. Trumble on the 4th day of July, 1911.

In such a still oil is continuously run thereinto, the lighter constituents in such oil being separated from the remainder of the oil and continuously removed from the still during the distilling operation. The walls of the still are usually heated, the lighter constituents of the oil are driven off, and the oil, as it flows downwardly in the still, decreases in volume to such an extent that frequently dry spots appear on the inner walls of the still upon which carbon deposits rapidly build up thereby cutting down the efficiency of the still and subjecting the walls of the still so covered by the carbon deposits to burning by the heat applied to the still.

One of the principal objects of my invention is to provide a vertical still of simple form and construction, in which the walls converge downwardly and inwardly so that the area of the walls of the still diminishes from the top to the bottom in proportion to the decrease in the volume of oil passing downwardly thereover, so that the walls of the still throughout its entire length are covered by the oil.

Another object of my invention is to provide a simple form of oil delivery means to the top of the still whereby oil is delivered in a continuous film throughout the inner circumference of the wall.

Other objects and advantages will appear hereinafter from the following description and the drawings.

Referring to the drawings, which are for illustrative purposes only,

Figure 1 is a vertical sectional view of an apparatus embodying a form of my invention.

Fig. 2 is a sectional plan view on line 2—2, Fig. 1.

Fig. 3 is an enlarged sectional view of a portion of the top of the still showing the oil being delivered to the still at its full capacity, and Fig. 4 is a view similar to Fig. 3 showing oil delivered to the still when the apparatus is running light.

The apparatus consists of a vertically arranged evaporating chamber or shell 11, the walls 12 of which are frusto conical in shape, converging downwardly and inwardly. 13 designates the bottom plate of the evaporator which is secured in the lower end of the walls 12 in any well known manner. 14 designates a residuum outlet pipe, the upper end of which extends through a flange connection 15 to the interior of the evaporator, a suitable valve 16 being provided in the pipe 14 for controlling the flow of residuum therethrough.

18 designates a circular angle iron extending around the walls 12 of the evaporating chamber and secured thereto in any suitable manner. 20 designates the upper end of the still which consists of a circular plate secured in any suitable manner to the angle iron 18 and being provided with a flanged outlet 21 through which extends a vapor takeoff pipe 22.

The oil delivering means for the evaporator consists of a continuous circular pipe 24 having a circular slot 25 in its lower side, the upper end of said walls 12 of the evaporator extending through the circular slot 25 to approximately the center of the pipe 24. The slot 25 is so arranged in the pipe 24 that a portion of the slot remains open on the inside of the walls of the evaporator thereby permitting any oil in the pipe on the inside of the walls of the evaporator to be delivered through the opening 25 downwardly over the inner walls of the evaporator in a thin film. The edge 30 of the pipe 24 is welded or otherwise secured to the outer side of the walls of the evaporator so that none of the liquid within the pipe may be discharged on the outside of the evaporator.

The oil is delivered to the pipe 24 through a pipe 31 which is connected to a suitable supply of oil which may be heated in any suitable manner to any desired temperature before the same is delivered to the still, the flow of the oil through the pipe 31 being controlled by a suitable valve 32.

33 designates the walls of the stack within which the evaporator may conveniently be placed, heat being delivered from any suitable heat supply, such as a furnace (not shown) through the flue 34 to the stack. 35 designates a base of fire brick or other suitable material upon which the evaporator is supported in the stack.

The apparatus is operated in the following manner:

Heated oil is delivered through the pipe 31 to the oil distributing pipe 24, and as the oil in such pipe 24 rises above the upper edge 40 of the evaporator it is discharged inwardly therefrom against the inner portion of the pipe 24, the shape of which causes the oil to be delivered downwardly against the inner wall of the evaporator, flowing downwardly thereover through the slot 25 in a thin film. As the oil travels downwardly over the inner walls of the evaporator the lighter constituents are released from the oil and pass upwardly and out of the evaporator through the pipe 22, the oil continuing its flow downwardly over the walls of the evaporator. As the lighter constituents continue being driven out of the oil, the volume of the oil diminishes, but due to the fact that the area of the walls of the evaporator correspondingly decreases, there remains sufficient oil on them to completely cover the same thereby preventing the appearance of dry spots on the evaporator.

In the event that any splashing should occur as the oil is delivered from the pipe 24 to the evaporator, such oil would not fall unretarded to the bottom of the evaporator, but would strike the inwardly converging walls of the evaporator and run down over the same. The vapors liberated from the flowing oil have an unobstructed path upwardly through the center of the evaporator and pass out of the evaporator through the pipe 22 as hereinabove referred to.

The unvaporized oil or residuum is discharged from the still through the pipe 14 heretofore referred to.

What I claim is:—

An evaporating apparatus comprising a still having side walls forming an inverted frusto conical shell, means for delivering oil to the inner surface of said walls in a thin film, said oil delivery means consisting of a conduit inclosing the upper edge of the side walls of the still and having an open circular slot on the inside of the side walls forming an opening between the inner walls of the still and the edge of the slot, means for delivering oil to the conduit, means for drawing off vapors from the still, and means for drawing off residuum from the still.

In testimony whereof, I have hereunto set my hand at San Francisco, California, this 14th day of March, 1918.

WILLIAM MEISCHKE-SMITH.